United States Patent [19]

Markunas

[11] Patent Number: 5,065,577

[45] Date of Patent: Nov. 19, 1991

[54] HYDROMECHANICAL DISPLACEMENT CONTROL FOR A POWER DRIVE UNIT

[75] Inventor: Albert L. Markunas, Roscoe, Ill.

[73] Assignee: Sundstrand Corporation, Rockford, Ill.

[21] Appl. No.: 440,519

[22] Filed: Nov. 22, 1989

[51] Int. Cl.$^5$ .................. F16H 61/42; F16H 61/46
[52] U.S. Cl. ............................ 60/450; 60/451; 60/466
[58] Field of Search ................ 60/448, 450, 451, 466

[56] References Cited

U.S. PATENT DOCUMENTS

| | | | |
|---|---|---|---|
| 3,177,964 | 4/1965 | Anderson | 60/451 X |
| 3,285,000 | 11/1966 | Christenson et al. | 60/451 X |
| 3,704,993 | 12/1972 | Monaco | 60/451 X |
| 3,732,041 | 5/1973 | Beal et al. | |
| 3,809,500 | 5/1974 | Staudenrausch | |
| 3,965,682 | 6/1976 | Herchenroder | 60/450 X |
| 4,103,489 | 8/1978 | Fletcher et al. | 60/451 X |
| 4,293,284 | 10/1981 | Carlson et al. | |
| 4,434,616 | 3/1984 | Christopher et al. | 60/451 |
| 4,478,136 | 10/1984 | Heiser et al. | |
| 4,479,349 | 10/1984 | Westveer | |
| 4,546,847 | 10/1985 | Abels | 60/450 X |
| 4,579,039 | 4/1986 | Ebbing | 60/451 X |
| 4,617,797 | 10/1986 | Williams | |
| 4,635,441 | 1/1987 | Ebbing et al. | |
| 4,695,230 | 9/1987 | Taplin | |
| 4,907,408 | 3/1990 | Barker | 60/451 |

Primary Examiner—Edward K. Look
Assistant Examiner—George Kapsalas
Attorney, Agent, or Firm—Wood, Phillips, Mason, Recktenwald & VanSanten

[57] ABSTRACT

The problem of energy wastage in power drive units having fixed displacement hydraulic motors is avoided in a system having a variable displacement hydraulic motor (10) without the expense normally associated with such variable displacement systems by a construction which includes a variable displacement hydraulic motor (10) provided with a hydraulic actuator (14). A servo valve (12) is adapted to be connected to a source of hydraulic fluid under pressure and a controller (24) and is connected to the motor (10) for controlling the flow of fluid thereto in response to signals received from the controller (24). A flow limiter (16) is connected between the servo valve (12) and a return to the fluid source. A flow sensor valve (18) is connected across the flow limiter (16) and is responsive to flow therethrough to provide a hydraulic control signal to the actuator (14) to control the displacement of the motor (10).

11 Claims, 2 Drawing Sheets

HYDROMECHANICAL DISPLACEMENT CONTROL FOR A POWER DRIVE UNIT

BACKGROUND OF THE INVENTION

1. Field of the Invention

This invention relates to a hydromechanical control for the displacement of a variable displacement hydraulic motor employed, for example, in a power drive unit.

2. Description of the Prior Art

Hydraulic motor driven actuating units or power drive units may be generally divided into two categories: those including a fixed displacement hydraulic motor and those including a variable displacement hydraulic motor. In the case of the fixed displacement motors, they are typically sized by a combination of stall torque, rated load and maximum speed required for their designed application. Because of the fixed displacement of the hydraulic motor, a considerable amount of hydraulic flow, and thus hydraulic power, is consumed at high speed operating conditions. Any difference between the hydraulic power drawn from the source and that delivered to the load will be dissipated in a servo valve that is typically utilized to control flow to and from the motor. This dissipation represents a power loss.

This power loss may be acceptable in some instances as a trade-off for the simplicity offered by a system employing a fixed displacement hydraulic motor. However, in many instances, the power loss is not acceptable. For example, the increasing secondary power requirements and decreasing heat sink capabilities of state-of-the art military and commercial aircraft may not permit and, in the future, will not permit, such power wastage.

Full, variable displacement hydraulic motors can realize a significant savings in hydraulic power for actuators over their fixed displacement counterparts, especially during high speed operation. However, this substantial improvement in efficiency is not without its cost. State-of-the-art methods for controlling variable displacement actuators typically involve an electronic controller with a plurality of differing control loops, with each loop requiring its own sensor. When one considers the redundancy typically required in aircraft control systems and avionics, an unsatisfactorily large cost for the multitude of sensors and controllers results.

Further, when employed where aiding loads or braking operations are required, the actuating systems may be pumping hydraulic fluid back into the hydraulic supply and distribution system; and some means must be added to accommodate the situation when the hydraulic motor acts as a pump in this fashion. For any of a variety of reasons, aircraft hydraulic system designers are reluctant to add any such means.

Thus, there is a real need for a simplified hydraulic actuator system that provides the energy savings of variable displacement systems but accomplishes the same without increasing electronic complexity, i.e., with the minimal sensing that is typically required only by fixed displacement hydraulic systems and wherein hydraulic fluid is not pumped back into the hydraulic system in the case of an aiding load or the like.

SUMMARY OF THE INVENTION

It is the principal object of the invention to provide a simplified control system for a hydraulic motor of the variable displacement type. More specifically, it is an object of the invention to provide such a system to utilize the effective cost savings obtainable with simplified sensor systems heretofore employed only with fixed displacement systems and yet achieve the energy savings heretofore attainable only with variable displacement systems.

An exemplary embodiment of the invention achieves the foregoing objects in a control system for a power drive unit which includes a variable displacement hydraulic motor, a hydraulic actuator connected to the motor for controlling the displacement thereof, and a servo valve adapted to be connected to a source of hydraulic fluid under pressure and a controller and, further, connected to the motor for controlling the flow of fluid thereto in response to signals received from a controller.

According to the invention, there is included a flow sensing means which is connected in the system for sensing flow through the motor and for providing a hydraulic control signal to the actuator. As a consequence of this, the only sensors and controllers required are those conventionally employed to control the servo valve as in those known systems utilizing fixed displacement hydraulic motors and a relatively simple flow sensor.

In a preferred embodiment of the invention, an orifice is provided through which flow from the motor must pass. The flow control means senses the pressure differential across such orifice as a measure of the flow to control the displacement of the motor by appropriately signaling the hydraulic actuator.

In a highly preferred embodiment of the invention, the orifice is contained within a flow limiter.

According to one embodiment of the invention, the flow sensing means, along with the actuator, are operable to provide for maximum displacement of the motor for no flow conditions. Consequently, when the servo system is at null, and an error signal is received, the motor is already configured to provide maximum response.

In a preferred embodiment of the invention, the flow sensing means includes a flow sensor valve which is a three-way valve. Means are provided for biasing the valve toward one position and a pressure responsive means connected across the orifice and the flow limiter acts in opposition to the biasing means. Preferably, the three-way valve is a spool valve including a spool, a first port connected to the hydraulic actuator, a second port adapted to be connected to the source of hydraulic fluid under pressure, and a third port adapted to be connected to the return. The biasing means and the pressure responsive means are operable to cause the spool to alternately meter flow between the first and second ports, or meter flow between the first and third ports, or to halt flow entirely.

A highly preferred embodiment of the invention contemplates locating a check valve between the actuator and the first port to allow free flow of fluid to the actuator along with an orifice in parallel with the check valve to allow restricted flow from the actuator.

The pressure responsive means included in the flow sensing valve may include a diaphragm having opposite sides connected across the orifice within the flow limiter.

Other objects and advantages will become apparent from the following specification taken in connection with the accompanying drawings.

DESCRIPTION OF THE PREFERRED EMBODIMENT

Figure 1:
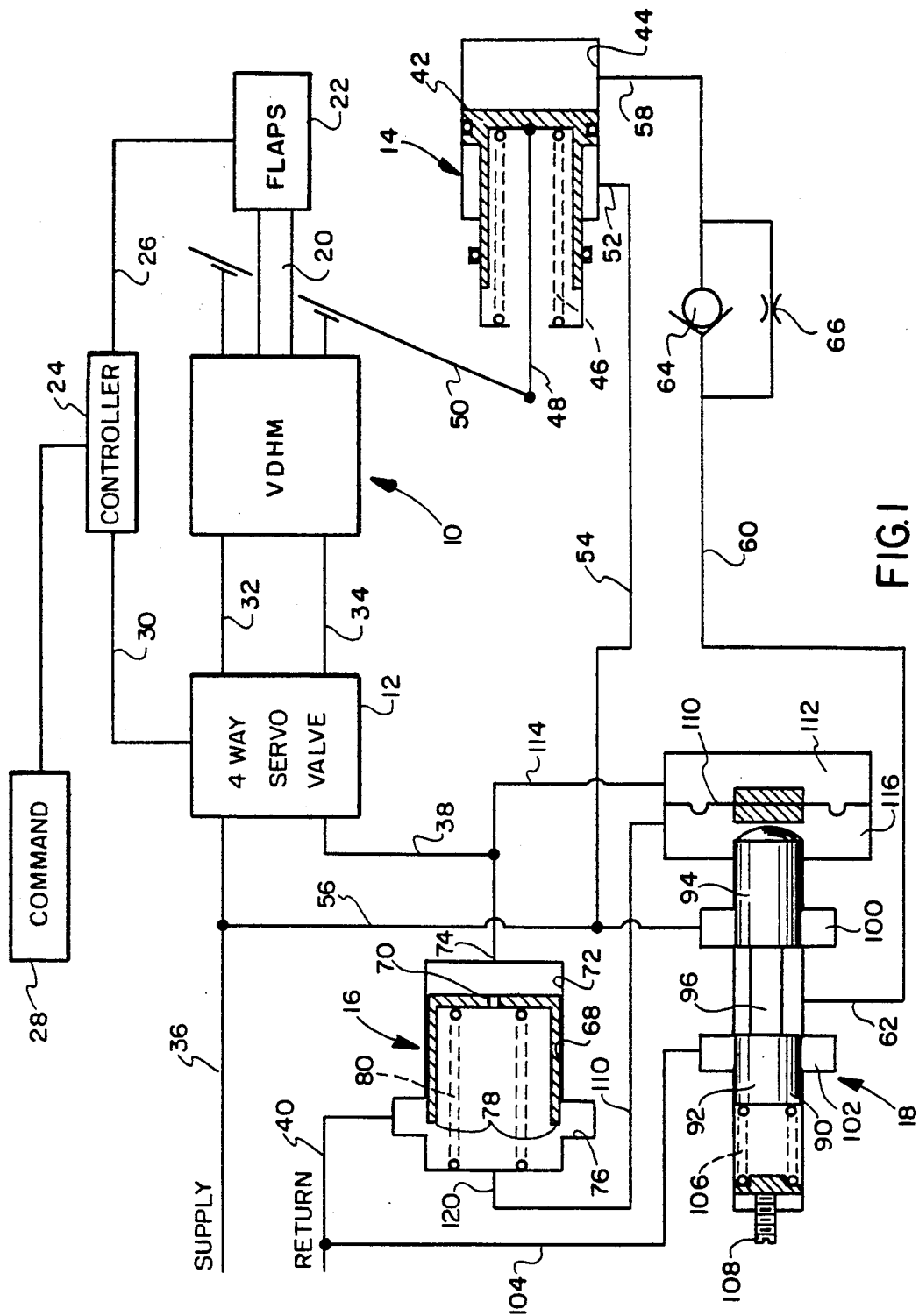
FIG. 1 is a schematic of a control system made according to the invention.

An exemplary embodiment of a control system made according to the invention is illustrated in the drawings and will be described herein in the environment of an aircraft mounted system for the control of flaps or the like. However, it is to be understood that the invention may be employed advantageously wherever simplified control of a variable displacement hydraulic motor is desired.

Referring to FIG. 1, the system is seen to include five basic components. The first is a variable displacement hydraulic motor, generally designated 10, while the second is a conventional four-way flow control servo valve 12. A third component is a hydraulic actuator or control piston, generally designated 14, connected to the variable displacement hydraulic motor 10 for selectively altering the displacement thereof.

A fourth component is a flow limiter, generally designated 16, while the fifth component is a flow sensor valve, generally designated 18.

The motor 10 conventionally is incapable of so-called "over center" operation. That is to say, the internal wobbler (not shown) which controls displacement is movable only to one side of center. The motor 10 includes an output shaft 20 connected through a gear box to, for example, control surfaces 22 such as the flaps on an aircraft. A conventional controller 24 is connected as by lines schematically illustrated 26 to the flaps 22 to receive position signals therefrom. The controller 24 may also receive command position signals from a source 28 and in response thereto, provide an error signal on a line 30 to the servo valve 12.

The servo valve 12 may be of any known type including electrohydraulic, direct drive or any of the types operated by a mechanical feedback. Most likely, and as generally illustrated in the drawing, an electrohydraulic or direct drive type of system will be used. The servo valve 12 is operable to control the volumetric flow, as well as the direction of flow, of hydraulic fluid on two lines, 32 and 34, to and from the motor 10.

A line 36 to the valve 12 is adapted to be connected to a hydraulic pump or the like to receive a supply of hydraulic fluid under pressure. A second line 38 from the servo valve extends to the flow limiter 16 and that in turn is connected by a line 40 to the return associated with the source of hydraulic fluid.

The hydraulic actuator 14 includes a piston 42 within a cylinder 44. A spring 46 biases the piston 42 toward the right as viewed in FIG. 1 and a linkage shown schematically at 48 connects the piston 42 to the conventional swash plate or displacement control 50 of the motor 10. The arrangement is such that the spring 46 tends to bias the actuator 14 to move the swash plate 50 toward the minimum displacement position.

The cylinder 44 includes a first port 52 which is connected via a line 54 and a line 56 to the line 36 to thus be connected to the source of hydraulic fluid under pressure. It will be observed that the effective surface area of the piston 42 facing the port 52 is substantially less than the effective surface area of the piston 42 facing a second port 58.

The second port 58 is connected via a line 60 to a first port 62 of the flow sensor valve 18. Included in the line 60 is a check valve 64 disposed to allow free flow along the line 60 to the cylinder 44. In parallel with the check valve 64 is an orifice 66 which allows reverse flow, that is, flow from the cylinder 44 to bypass the check valve 64 and occur only in a restricted fashion.

Turning now to the flow limiter 16, the same includes an internal piston 68 provided with an orifice 70. The piston 68 is movable within a cylinder 72 which in turn is connected via a port 74 to the servo valve 12 via the line 38.

The cylinder 72 includes an annulus 76 adjacent the skirt 78 of the piston 68, which annulus is connected to the line 40 and thus to the return of the hydraulic system. Also included is a spring 80 which biases the piston 68 toward the right as viewed in FIG. 1. The pre-load provided by the spring 80 corresponds to the maximum flow condition.

This arrangement provides a means of preventing the motor 10 from pumping fluid back into the system in the case of an aiding load. Specifically and conventionally, as the flow through the flow limiter 16 begins to exceed a set point flow, the piston 68 will begin to move to the left against the bias of the spring 80 and thereby begin to close off the annulus 76. The resulting increasing restriction to fluid flow will cause the pressure drop across both the orifice 70 and the flow area defined by the skirt 78 and the annulus 76 to rapidly increase. This increase, in effect, turns the motor 10 into a pump as the pressure in the motor return line 38 now exceeds supply pressure.

The result is the negative torque associated with an aiding load as the motor 10 pumps hydraulic fluid through the flow limiter 16 in the same direction as if the motor 10 were motoring; and this in turn means that fluid is not pumped back into the system. Those skilled in the art will readily recognize and understand this essentially conventional flow limiter operation.

Turning now to the flow sensor valve 18, the same is a three-way valve including a spool 90 having lands 92 and 94 at its ends and an intermediate groove 96. The first port 62 described earlier is in fluid communication with the groove 96 at all times. A second port 100 is connected via the line 56 to the source of hydraulic fluid under pressure, while a third port 102 is connected via a line 104 to the return. The ports 100 and 102 may be simultaneously blocked by the lands 94 and 92, respectively, as illustrated. Alternatively, if the spool 90 shifts to the left as viewed in FIG. 1, the first port 62 and the third port 102 will be placed in fluid communication with the edge of the land 92 metering flow between the two. The second port 100 will be blocked by the land 94 at this time. Should the valve spool 90 be moved to the right as viewed in FIG. 1, then the third port 102 will be shut off by the land 92 with fluid communication being established between the first port 62 and the second port 10 with the edge of the land 94 metering the flow between the two.

A spring 106 is in engagement with the land 92 and urges the spool 90 to the right as viewed in FIG. 1. An adjustment screw 108 may be utilized to vary the bias applied by the spring 106 to the spool 90.

On the opposite side of the spool 90, a diaphragm 110 abuts the spool 90 and is conditioned to operate in opposition to the spring 106. Specifically, a chamber 112 on the right hand side of diaphragm 110 is connected via line 114 to the servo valve 12 via the line 38. A chamber 116 on the left hand side of the diaphragm 110 is connected via a line 118 to a port 120 to the cylinder 72 on the side of the piston 68 opposite from the port 74. Consequently, the diaphragm 110 will be subject to a pressure differential whenever fluid is flowing through the orifice 70; and since flow will always be from the servo valve 12 along the line 38 to the return by reason of the presence of the flow limiter 16, the chamber 112 will be at higher pressure than the chamber 116 whenever fluid is flowing. The actual pressure differential will be proportional to the amount of flow as is well known. When no flow is occurring, the chambers 112 and 116 will be at equal pressure and the diaphragm 110 will not act in opposition to the spring 106.

Figure 2:
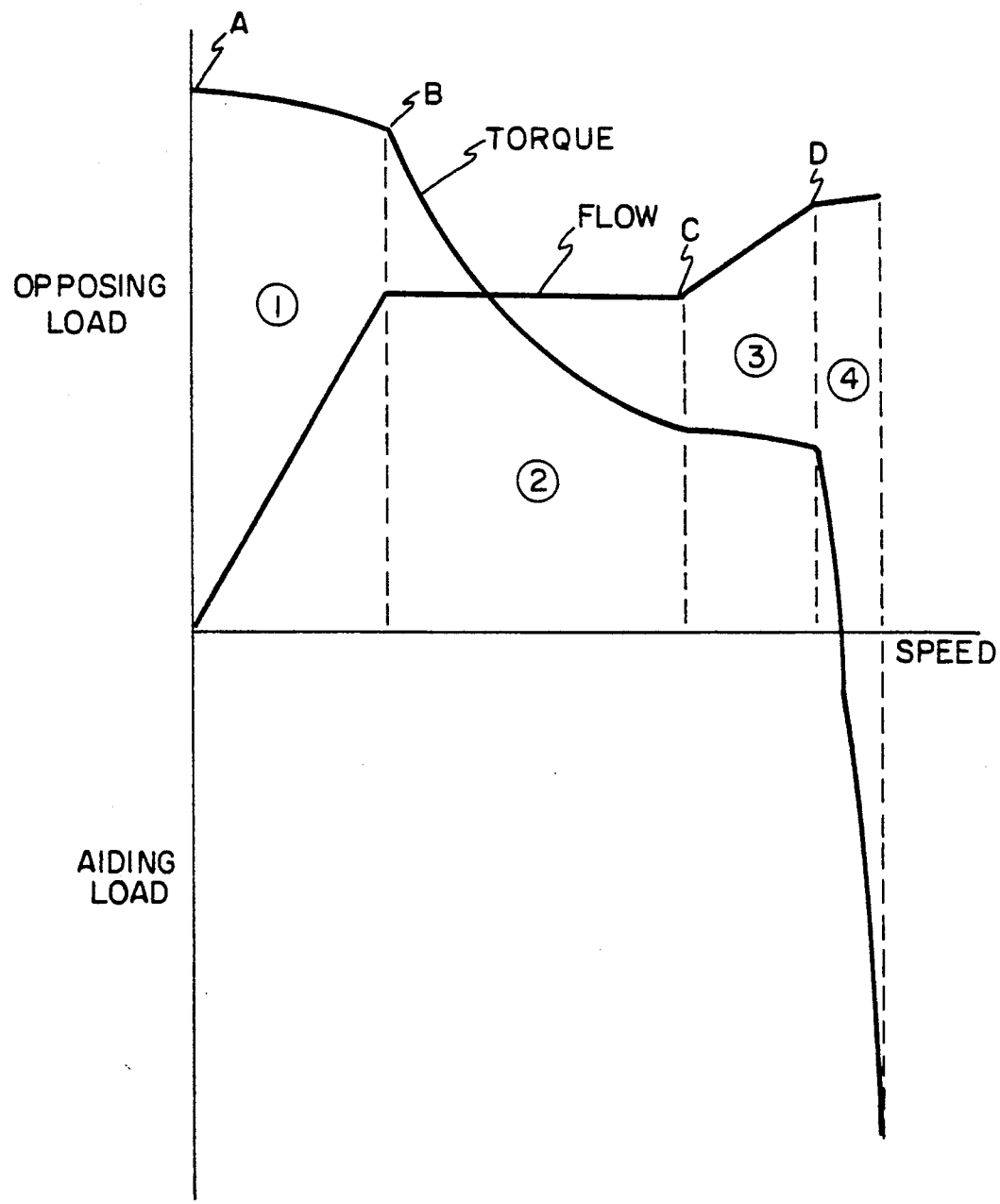
FIG. 2 plots motor speed versus load conditions during operation of the system.

A no flow condition, of course, corresponds to a null condition of the servo system. That is to say, the motor 10 will be quiescent because the servo valve 12 will be at null and will not be passing fluid to the motor 10. As a consequence, the spool 90 may be shifted somewhat to the right as viewed in FIG. 1 by the spring 106 and supply pressure will be applied to the piston 42 via the port 58 to drive the piston 42 to the left as viewed in the figure and cause the swash plate 50 to be moved to the maximum displacement position for the motor 10. This conditions the system to respond with maximum torque as soon as an error signal appears. This condition is illustrated at point A marked in FIG. 2 which plots motor speed against load conditions, both opposing and aiding. Note that for this condition, the check valve 64 will allow free flow of hydraulic fluid to the cylinder 44 for maximum response, while the orifice 66 in concert with the check valve 64 will decrease the rate of response when displacement decreases are required so as to reduce the sensitivity of the system to transitional forces such as dithering of flaps due to buffeting or the like. By causing the system to normally be set up at maximum displacement, maximum torque for rapid acceleration and response to new commands should always be available.

If a large change in commanded position is generated at the command source 28, the controller 24, sensing a large error, will drive the servo valve 12 to a wide open position, allowing hydraulic flow to the motor 10 and accelerating the same. The motor 10, being a positive displacement motor, will have the volumetric flow through the same increase as speed increases. And, of course, as the volumetric flow from the motor increases, the volumetric flow through the flow limiter 16 will increase, thereby increasing the pressure differential across chambers 112 and 116. (At this time, the piston 68 within the flow limiter 16 will not shift positions due to the pre-load provided by the spring 80).

The increasing pressure differential across the diaphragm 110 causes the spool 90 to move to the left halting the metered flow from the second port 100 to the first port 62, while beginning to open the third port 102. This allows flow from the cylinder 44 to the return, reducing torque; and this position is shown at point B in FIG. 2. As the commanded position is reached, the flow sensor valve 18 will adjust the displacement of the motor 10 such that the pressure differential across the orifice 70 is such as to keep the spool 90 generally in the position shown. Any increase in flow will cause the spool 90 to move to the left, reducing motor displacement further to reduce flow back to the set point commanded by the controller 24. Any reduction in motor flow will cause the spool 90 to move to the right, increasing motor displacement and causing flow to return toward the set point.

Motor flow may be held constant as the motor speed increases by decreasing motor displacement. At some speed, the motor displacement will reach a minimum displacement which may be determined by maximum aiding loading conditions, and the flow will begin to increase. This is shown at point C in FIG. 2. This flow increase will continue until the flow limiter 16 comes into action to limit flow and thus motor speed at the now fixed motor displacement. This is shown at point D.

There are thus, four distinct regions of operation. In the region labelled "1," the motor is at maximum displacement and flow increases linearly with speed. In the region numbered "2," the motor displacement will be modulated by action of the flow sensor valve 18. In the region labelled "3," the motor is at minimum displacement and flow is increasing linearly with motor speed. In the fourth operating region, the motor is at minimum displacement and the flow limiter 16 is actively restraining both speed and flow.

In operation, as the actuator output approaches its commanded position, the controller 24 causes the servo valve 12 to reduce flow to the motor 10, thereby reducing motor speed. When null is achieved, flow will be cut-off.

From the forgoing, it will be seen that the invention provides a control system embodying a variable displacement hydraulic motor utilizing only the sensors heretofore required for the simpler fixed displacement control systems. As a consequence, the invention is susceptible to retrofitting on existing aircraft having fixed displacement systems and may be utilized at considerably less cost than typical variable displacement systems because of the minimization of the number of sensors and controllers. It is accordingly simpler, more reliable and less expensive than systems heretofore known and provides the added benefit of the savings of energy found only in variable displacement systems.

I claim:

1. A control system for a power drive unit comprising:
   a variable displacement hydraulic motor;
   a hydraulic actuator connected to said motor for controlling the displacement thereof;
   a servo valve adapted to be connected to a source of hydraulic fluid under pressure and a controller, and connected to said motor for controlling the flow of fluid thereto in response to signals received from the controller;
   a flow limiter connected between said servo valve and a return to the fluid source; and
   a flow sensor valve connected across said flow limiter and responsive to flow therethrough to provide a hydraulic control signal to said actuator to control the displacement of said motor.

2. The control system of claim 1 wherein said flow sensor valve and said hydraulic actuator are operable to provide for maximum displacement of said motor for a no flow condition.

3. The control system of claim 1 wherein said flow sensor valve is a three-way valve having a valve member and includes means for biasing the valve member toward one position and a pressure responsive means connected across said flow limiter and acting in opposition to said biasing means.

4. The control system of claim 3 wherein said three-way valve includes a spool, a first port connected to said hydraulic actuator, a second port adapted to be connected to said source and a third port adapted to be connected to said return, said biasing means and said pressure responsive means being operable to cause said spool to alternatively meter flow between said first and second ports, or said first and third ports or to halt flow entirely.

5. The control system of claim 4 further including a check valve between said actuator and said first port to allow free flow to said actuator, and an orifice in parallel with said check valve to allow restricted flow from said actuator.

6. The control system of claim 3 wherein said pressure responsive means includes a diaphragm having opposite sides connected across said flow limiter.

7. The control system of claim 1 wherein said flow sensor valve senses pressure differential across said flow limiter as a measure of flow therethrough.

8. A control system for a power drive unit comprising:
- a variable displacement hydraulic motor;
- a hydraulic actuator connected to said motor for controlling the displacement thereof;
- a servo valve adapted to be connected to a source of hydraulic fluid under pressure and a controller, and connected to said motor for controlling the flow of fluid thereto in response to signals received from the controller; and
- flow sensing means connected in said system for sensing flow through said motor and for providing a hydraulic control signal to said actuator, said flow sensing means including an orifice through which flow for said motor must pass and means for sensing the pressure differential across said orifice to provide said hydraulic control signal to said actuator.

9. The control system of claim 8 wherein said flow sensing means includes a valve having first, second and third ports, a spool for metering flow between said first and second ports and between said first and third ports, a spring biasing said spool in one direction, and pressure differential sensing means operating against said spool in opposition to said biasing means.

10. A control system for a power drive unit comprising:
- a variable displacement hydraulic motor;
- a hydraulic actuator connected to said motor for controlling the displacement thereof;
- a servo valve adapted to be connected to a source of hydraulic fluid under pressure and a controller, and connected to said motor for controlling the flow of fluid thereto in response to signals received from a controller; and
- an orifice connected to receive flow from said motor; and
- a flow sensor valve, including a pressure differential sensor connected across said orifice, for alternatively connecting said actuator to said source or said return to cause said actuator to move said motor to maximum displacement for minimum pressure differentials and to progressively decrease motor displacement as pressure differentials increase.

11. The control system of claim 10 wherein said orifice is contained within a flow limiter.

* * * * *